(12) United States Patent
Gariepy et al.

(10) Patent No.: US 6,710,969 B2
(45) Date of Patent: Mar. 23, 2004

(54) ROTARY MAGAZINE TAPE STORAGE SYSTEM

(75) Inventors: Jeffrey A. Gariepy, West Boylston, MA (US); Stephen Stamm, Fort Lupton, CO (US); Victor Finley, Westminster, CO (US); Mark W. Ackerman, Douglas, MA (US); Chan S. Kim, Franklin, MA (US); Satya Mallick, Milford, MA (US); George A. Saliba, Northboro, MA (US)

(73) Assignee: Quantum Corporation, Milpitas, CA (US)

( * ) Notice: Subject to any disclaimer, the term of this patent is extended or adjusted under 35 U.S.C. 154(b) by 75 days.

(21) Appl. No.: 09/903,438

(22) Filed: Jul. 11, 2001

(65) Prior Publication Data

US 2003/0011925 A1 Jan. 16, 2003

(51) Int. Cl.$^7$ .............................................. G11B 15/68
(52) U.S. Cl. ........................................................ 360/92
(58) Field of Search ........................................... 360/92

(56) References Cited

U.S. PATENT DOCUMENTS

| | | | | |
|---|---|---|---|---|
| 4,275,425 A | * | 6/1981 | Watanabe et al. | 360/92 |
| 4,907,889 A | * | 3/1990 | Simone | 360/92 |
| 5,449,091 A | * | 9/1995 | Dalziel | 360/92 |
| 5,498,116 A | * | 3/1996 | Woodruff et al. | 360/92 |
| 5,659,434 A | * | 8/1997 | Yamakawa et al. | 360/92 |

* cited by examiner

*Primary Examiner*—Robert S. Tupper
(74) *Attorney, Agent, or Firm*—James P. Broder; Steven G. Roeder (57) ABSTRACT

A tape storage system (10) includes a rack assembly (14), a plurality of cartridges (20), a first tape drive (66) and a second tape drive (106). The rack assembly (14) includes a rotatable magazine mount (22), a cartridge magazine (16) secured to the magazine mount (22), and a magazine mover (26) to rotate the cartridge magazine (16). The tape storage system (10) also includes a first transport assembly (28) to transport one of the cartridges (20) between the cartridge magazine (16) and the first tape drive (66). Uniquely, the cartridge magazine (16) rotates to position one of the cartridges (20) over the first transport assembly (28). The tape storage system (10) can also include a second transport assembly (32) for transporting one of the cartridges (20) between the cartridge magazine (16) and the second tape drive (106). With this design, the rack assembly (14) can efficiently transport two different sized cartridges (20A, 20B).

37 Claims, 7 Drawing Sheets

ROTARY MAGAZINE TAPE STORAGE SYSTEM

FIELD OF THE INVENTION

The present invention relates generally to tape storage systems. More specifically, the present invention relates generally to a tape storage system that uses tape cartridges and a method of transporting cartridges between a rack assembly and a tape drive of the tape storage system.

BACKGROUND

Automated tape storage systems are used for storing and retrieving relatively large amounts of information in digital form. One type of tape storage system includes a tape drive, a rack assembly that has one or more tape magazines, and a robotic cartridge handling mechanism. Each tape magazine typically holds a plurality of tape cartridges, which are retrieved from the tape magazines for usage in the tape drive. With this type of system, each tape magazine can include a plurality of tape cavities for holding the cartridges. The robotic cartridge handling mechanism individually retrieves one of the cartridges from one of the tape cavities and places the cartridge within the tape drive.

Such robotic cartridge handling mechanisms are often extremely complex. Typically, these mechanisms have to navigate around the rack assembly, moving between the tape drive and the desired cartridge in the rack assembly. Unfortunately, this type of system results in unnecessary waiting time, which can lead to decreased throughput of the system.

Additionally, robotic cartridge handling mechanisms have difficulty retrieving different sized cartridges. Such mechanisms have, in the past, only been able to accommodate one specific sized cartridge for transport between the tape drive and the rack assembly. This size limitation can necessitate the use of multiple automated tape storage systems, which can increase costs to the user. Further, having multiple systems can result in a more complicated system that is more difficult to maintain and service.

Another drawback of current storage systems involves the problem of servicing the tape drive without bringing the entire storage system to a standstill. Oftentimes, a tape drive may require repair or service, which can lead to taking the entire tape storage system offline. In other words, once the tape drive is removed from the system, the entire tape storage system is inoperable. In such instances, the information within the tape storage system become inaccessible, causing a substantial decrease in efficiency and throughput of the system.

Cartridge handling mechanisms have been developed to transfer cartridges between rack assemblies and tape drives without interfering with the operation of the tape drives. These cartridge handling mechanisms typically include a frame and a receiver that receives the cartridge. Unfortunately, existing cartridge handling mechanisms are not completely satisfactory. In particular, these cartridge handling mechanisms can take-up too much space within the storage system and/or require too much clearance to operate in the storage system. In addition, these cartridge handling mechanisms do not operate efficiently due to the time required to transport the desired cartridge between the tape magazine and the tape drive.

In light of the above, the need exists to provide an improved transport mechanism within a tape storage system that quickly and efficiently transfers a cartridge between a rack assembly and a tape drive. Another need exists to provide a rack assembly that eliminates the navigational requirements of the cartridge handling mechanism thereby decreasing transport waiting time, and increasing throughput of the tape storage system. Still another need exists to provide a tape storage system that utilizes different sized cartridges. Yet another need exists to provide a tape storage system that allows service or repair to the tape storage system without completely interrupting operation of the tape storage system. Still another need exists to provide a tape storage system that is relatively compact, has improved durability, and is relatively easy and cost efficient to manufacture and utilize.

SUMMARY

The present invention is directed to a rack assembly of a tape storage system for use with a tape drive arrangement including a first tape drive, and a plurality of cartridges, that satisfies these needs. The rack assembly includes a rotatable magazine mount and a substantially circular cartridge magazine that is removably secured to the magazine mount. Additionally, the rack assembly includes a magazine mover that rotates the cartridge magazine. The magazine mount is typically rotatably secured to a housing base. The cartridge magazine can include at least twenty (20) tape cavities that each house one of the cartridges. The tape storage system also includes a first transport assembly that transports one of the cartridges between the cartridge magazine and the first tape drive.

The cartridge magazine rotates to position one of the tape cavities adjacent to the first transport assembly. At least a portion of the first transport assembly is typically positioned substantially between the housing base and the cartridge magazine. The first transport assembly includes a gripper assembly having a cartridge gripper that releasably secures one of the cartridges during transport between the cartridge magazine and the first tape drive.

The rack assembly can also include a second transport assembly that transports one of the cartridges between the cartridge magazine and a second tape drive. The second transport assembly is positioned adjacent to the first transport assembly. The first and second transport assemblies can transport two different sized cartridges from within the cartridge magazine to their respective tape drives, depending upon the requirements of the tape drives. Moreover, because both transport assemblies operate with the same cartridge magazine, the inoperability of one of the tape drives, i.e. for servicing or repair, will not result in taking the entire tape storage system offline.

Additionally, the present invention includes a method for transporting a cartridge between a cartridge magazine and a tape drive. The method includes the steps of providing a cartridge magazine, providing a transport assembly having a gripper assembly, positioning the cartridge between the gripper assembly and the tape drive, rotating the cartridge magazine to align the cartridge substantially between the gripper assembly and the tape drive, and gripping the cartridge with the gripper assembly. Additional steps include moving the gripper assembly to near the tape drive, and transferring the cartridge from the gripper assembly into the tape drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
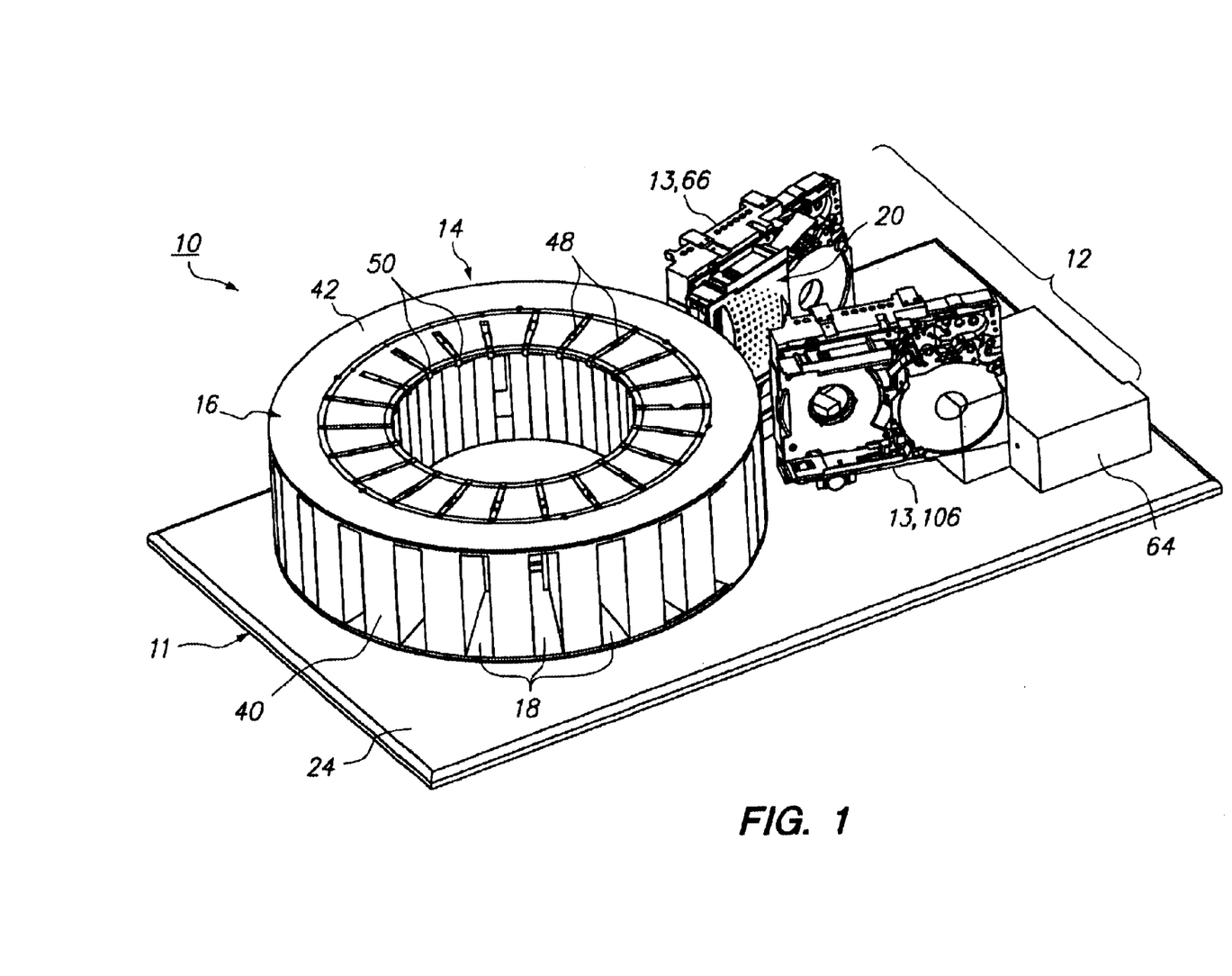
FIG. 1 is a perspective view of a portion of a tape storage system having features of the present invention.

Referring initially to FIG. 1, a tape storage system 10 having features of the present invention includes a system housing 11, a tape drive arrangement 12 having one or more tape drives 13, and one or more rack assemblies 14. Each rack assembly 14 includes a cartridge magazine 16 having a plurality of tape cavities 18 that are each adapted to receive a cartridge 20. Additionally, each rack assembly 14 includes a magazine mount 22, a magazine mover 26, a transport assembly group 27 including a first transport assembly 28, and a gripper assembly mover 30. The transport assembly group 27 can also include a second transport assembly 32. The rack assembly 14 is uniquely designed to allow selective and efficient transport of the cartridges 20 between the cartridge magazine 16 and the tape drives 13. As provided below, the cartridge magazine 16 rotates relative to the transport assemblies 28, 32, in order to expedite transport of one or more of the cartridges 20 between the cartridge magazine 16 and one or more of the tape drives 13.

The cartridge magazine 16 rotates to position one of the tape cavities 18 adjacent to one of the transport assemblies 28, 32, in preparation for loading or receiving one of the cartridges 20. With this design, the tape storage system 10 can efficiently locate and transport the desired cartridge 20 to and from the tape drive 13, with minimal delay in operation of the tape drive 13.

The system housing 11 at least partially encloses the tape drive arrangement 12 and the rack assembly 14. The system housing 11 typically includes a housing base 24, a housing top (not shown for clarity) and one or more housing sides (not shown) that secure the housing base 24 to the housing top.

In the embodiments illustrated in the Figures, the housing base 24 serves as a mounting surface for various components of the rack assembly 14 including the magazine mount 22, the first transport assembly 28, and the second transport assembly 32, if required. The housing base 24 can also act as a surface for mounting of the tape drive arrangement 12. The housing base can be constructed from any rigid material, such as metal, wood or plastic.

Figure 2:
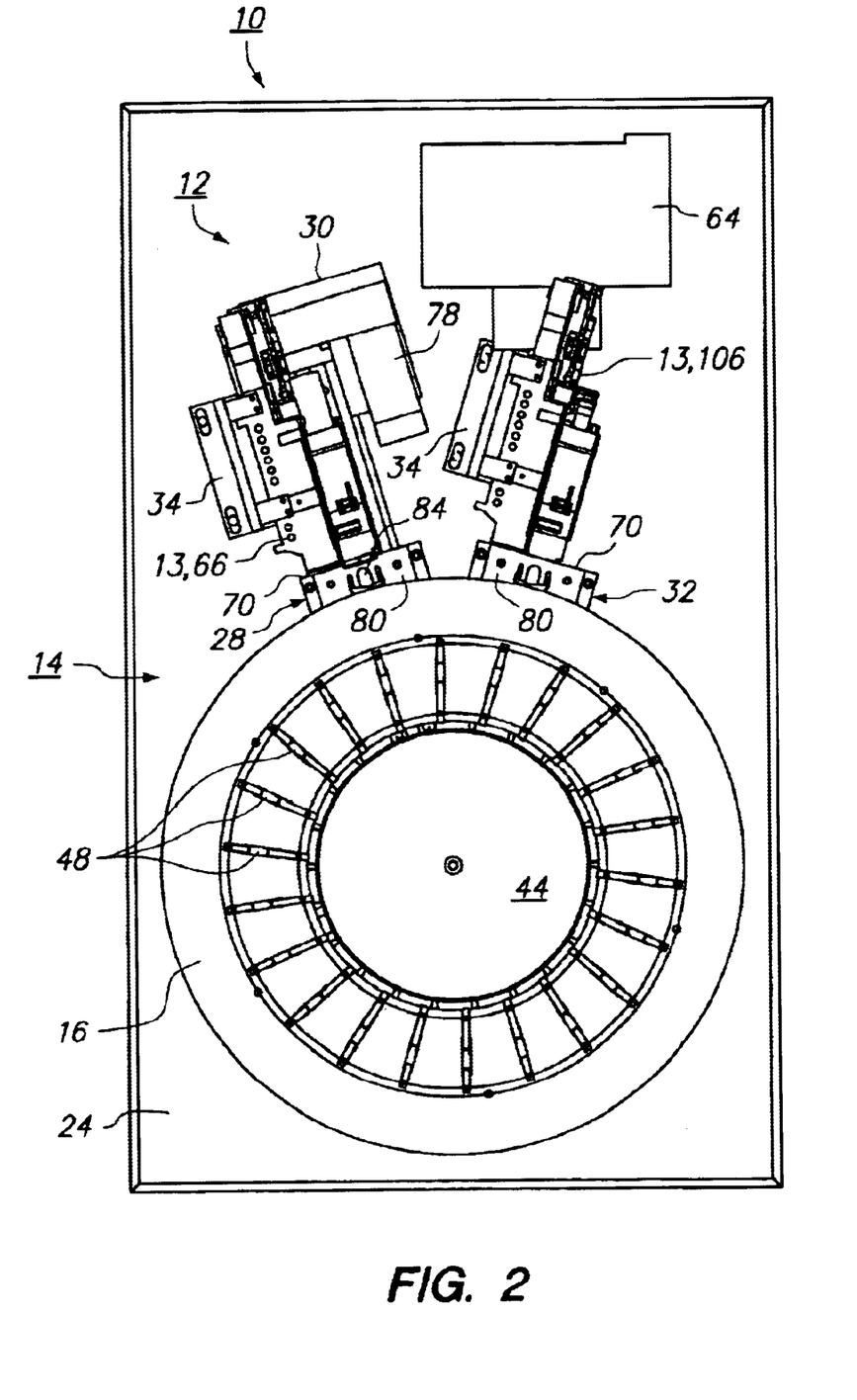
FIG. 2 is a top view of the portion of the tape storage system of FIG. 1.
Figure 3:
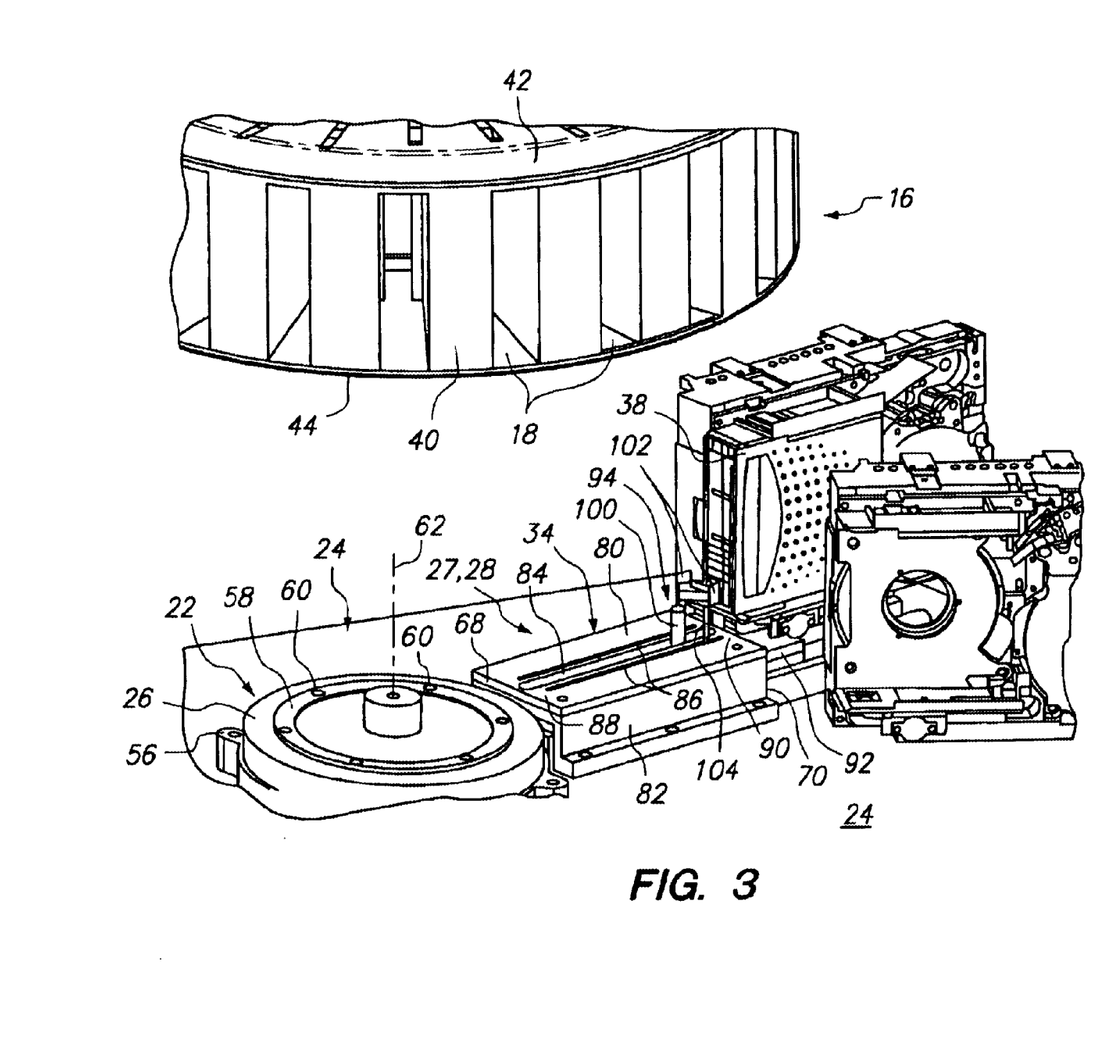
FIG. 3 is a perspective view of a portion of a rack assembly having features of the present invention with an exploded view of a portion of a cartridge magazine for clarity, and portions of two tape drives.

The tape drive arrangement 12 transfers information to and from the cartridges 20. The tape drive arrangement 12 can include a plurality of tape drives 13, as illustrated in FIGS. 1–3. The design, location and the number of tape drives 13 can be varied to suit the requirements of the tape storage system 10, as explained below. For example, suitable tape drives 13 are sold by Quantum Corporation, the assignee of the present invention, under the trademarks DLT™4000 and DLT™7000. Alternately, each tape drive arrangement 12 can include only one drive 13 or more than two tape drives 13. Each tape drive 13 can be designed to use the same type and/or size of cartridge 20 or an alternate type or size of cartridge.

Referring to FIG. 3, each tape drive 13 is typically removably secured to a drive mount 34. The drive mount 34 can be secured to the housing base 24 of the system housing 11 with the use of drive fasteners (not shown). The drive fasteners can be screw, bolts or other suitable fasteners. The drive fasteners extend through the drive mounts into drive mount apertures 36 (illustrated in FIG. 5) in the housing base 24.

Figure 4A:
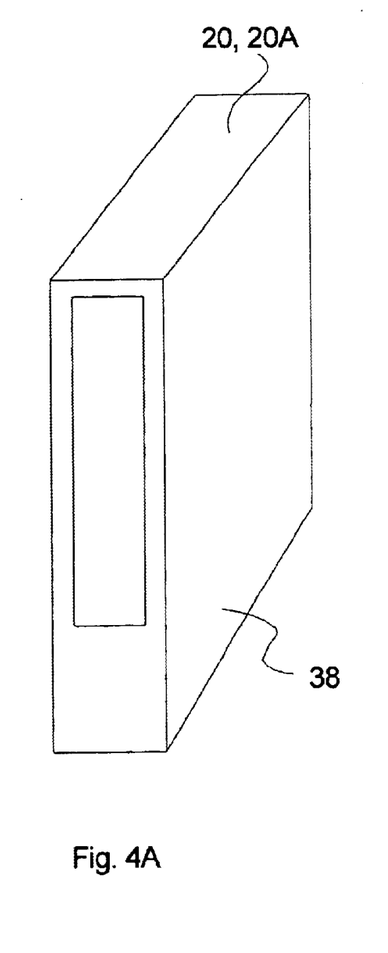
FIG. 4A is a perspective illustration of a first-sized cartridge.
Figure 4B:
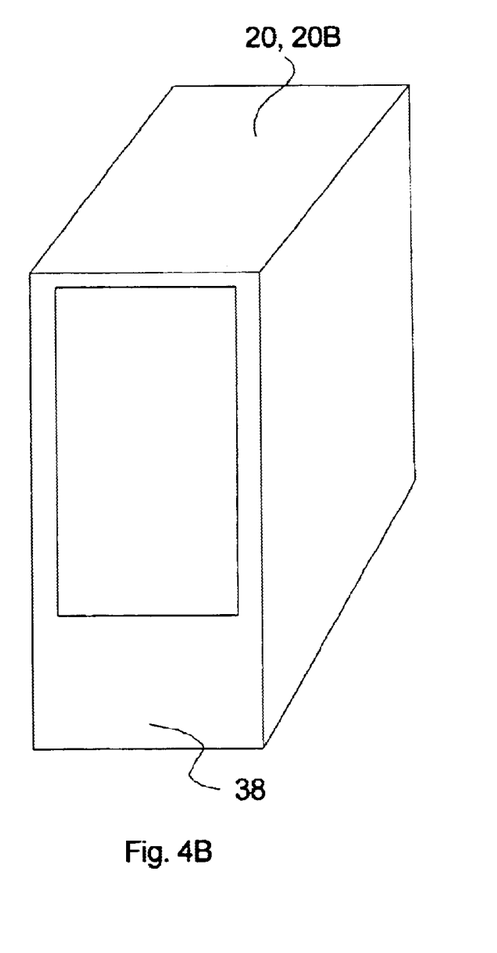
FIG. 4B is a perspective illustration of a second-sized cartridge.

Each cartridge 20 can include a storage medium (not shown) that stores data in a form that can be subsequently retrieved if necessary. The cartridges 20 can vary in size and shape. A magnetic storage tape (not shown) is commonly used in the cartridges 20 to store data in digital form. Referring to FIGS. 1, 3, 4A and 4B, each cartridge 20 includes a substantially rectangular cartridge housing 38 that encloses the storage medium. Suitable cartridges 20 sold by Quantum Corporation include those under the trademark DLT™. In some embodiments of the present invention, a first-sized cartridge 20A and a second-sized cartridge 20B can be accommodated by the tape storage system 10, for example. For example, the first-sized cartridge 20A and the second-sized cartridge 20B can differ in size and shape from one another, as illustrated in FIGS. 4A and 4B. Alternately, the first sized cartridge 20A and the second sized cartridge 20B can be similar in shape and size.

The number of individual rack assemblies 14 in the tape storage system 10 can be varied according to the data storage requirements. One rack assembly 14 having one cartridge magazine 16 is illustrated in FIGS. 1–3. However, the tape storage system 10 can include more than one rack assembly 14, with each rack assembly 14 typically having one or more cartridge magazines 16. Each cartridge magazine 16 can be secured to the magazine mount 22. Moreover, the rack assembly can be used in a desk top arrangement (not shown) or in a tower arrangement (not shown).

As indicated above, the number of cartridge magazines 16 in each rack assembly 14 and the configuration of the cartridges 20 within each cartridge magazine 16 can be varied to suit the design requirements of the tape storage system 10. Each cartridge magazine 16 includes a magazine body 40 having one or more tape cavities 18 for receiving the cartridges 20 within the rack assembly 14. The size of the cartridge magazine can vary. For example, the cartridge magazine can be 19 inches in diameter. Alternatively, the cartridge magazine can be larger or smaller than 19 inches in diameter.

The design, location and number of tape cavities 18 can be varied according to the design of the cartridges 20 and the tape storage system 10. Each tape cavity 18 can define a rectangular shaped slot that is sized and shaped to retain a single cartridge 20 within the magazine body 40.

Although each cartridge magazine 16 is adapted to hold at least one cartridge 20, cartridge magazines 16 with four (4) to twenty-two (22) or more individual cartridges 20 can be utilized with the present invention. In the embodiment illustrated in FIGS. 1 and 2, twenty-two tape cavities 18 are included in each cartridge magazine 16. Additionally, the cartridge magazine 16 can include tape cavities 18 with varying sizes for receiving different sized cartridges 20A, 20B. For example, the cartridge magazine 16 illustrated in the Figures includes tape cavities 18 that are adapted to hold a first sized cartridge 20A having a width of approximately one-inch, and a second sized cartridge 20B having a width of approximately two-inches. Moreover, each cartridge magazine 16 can hold a variety of different sized cartridges 20A, 20B, depending on the design requirements of the rack assembly 10.

Referring to FIGS. 1 and 3, the cartridge magazine 16 includes a magazine top 42 positioned above the magazine body 40, and a spaced-apart magazine bottom 44 positioned below the magazine body 40. The magazine top 42 can be generally disk-shaped, although the shape can vary depending upon the requirements of the cartridge magazine 16. The magazine top 42 can be removable from the magazine body 40 to allow insertion or removal of cartridges 20 from the tape cavities 18 of the cartridge magazine 16. The magazine top 42 can include top fasteners 46 for securing the magazine top 42 to the magazine body 40.

The cartridge magazine 16 can include a plurality of cartridge retainers 48. Each cartridge retainer 48 retains one of the cartridges 20 in each of the tape cavities 18 during rotation or movement of the cartridge magazine 16. Each cartridge retainer 48 typically extends downward from the magazine top 42 into one of the tape cavities 18 of the cartridge magazine 16. With this design, each cartridge retainer 48 presses against one of the cartridges 20, thereby holding the cartridge 20 in the tape cavity 18. The force which retains the cartridge 20 in the tape cavity 18 is overcome during transport of the cartridge 20 between the cartridge magazine 16 and the tape drive 13, as will be explained below. Alternatively, the cartridge retainers 48 can extend upward from the magazine bottom 44, for example.

Figure 6:
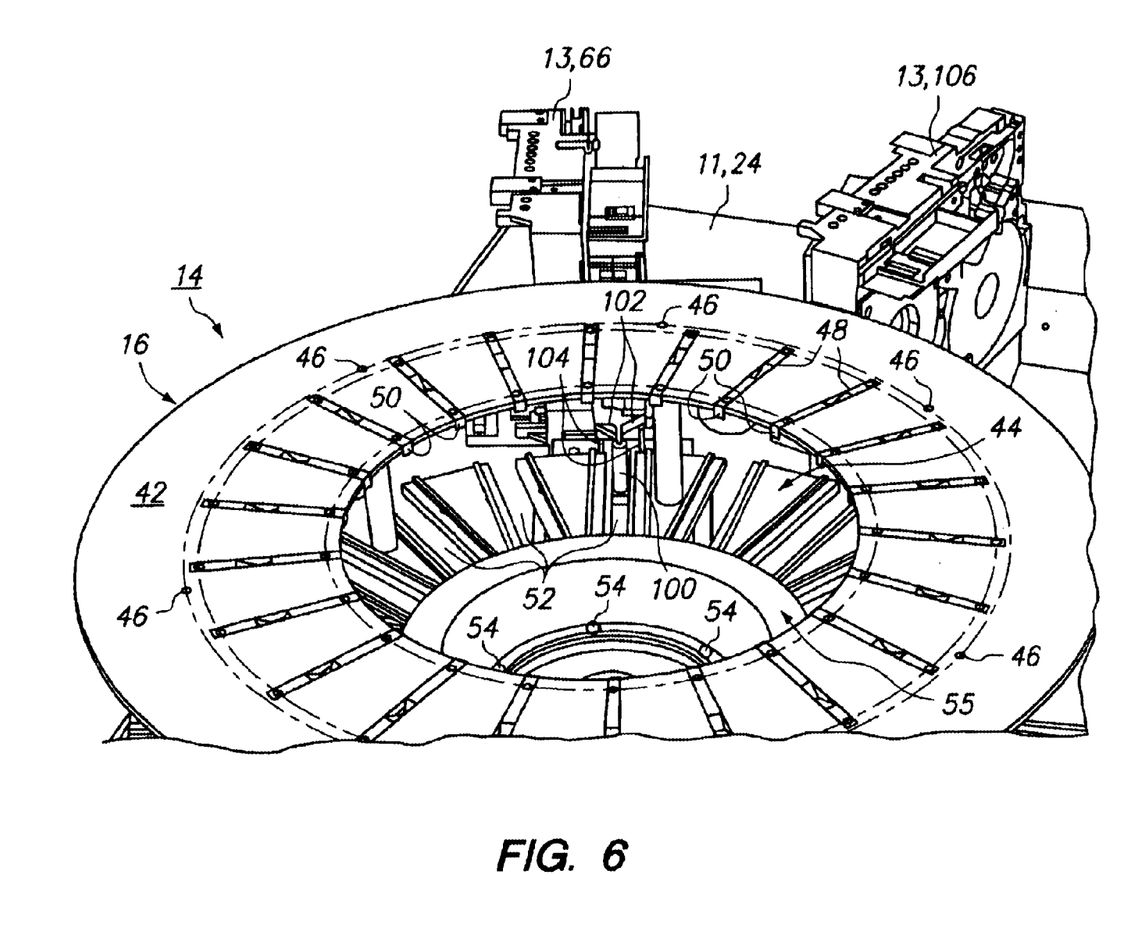
FIG. 6 is a perspective view of a portion of the tape storage system, including the first and second tape drives and a portion of the rack assembly having features of the present invention.

The cartridge magazine 16 can also include one or more retainer clips 50 to assist in preventing unwanted exiting or movement of the cartridges 20 from the tape cavities 18. The retainer clips 50 can be formed as a unitary structure with the cartridge retainers 48 (as shown in FIGS. 1 and 6), or alternatively, the retainer clips 50 can be separate structures. The cartridge retainers 48 and the retainer clips 50 allow rapid rotation of the cartridge magazine 16, i.e. in some embodiments, less than one (1) second per 360 degrees of rotation, while maintaining proper positioning of the cartridges 20 within the tape cavities 18.

The magazine bottom 44 typically acts as a "floor" of the tape cavities 18. The magazine bottom 44 is generally disk-shaped, and can include one or more bottom apertures 52 for allowing movement of the transport assemblies 28, 32, during operation. One bottom aperture 52 can be present in each tape cavity 18, thereby providing appropriate space for portions of the transport assembly 28, 32, to move during operation of the tape storage system 10.

Figure 7:
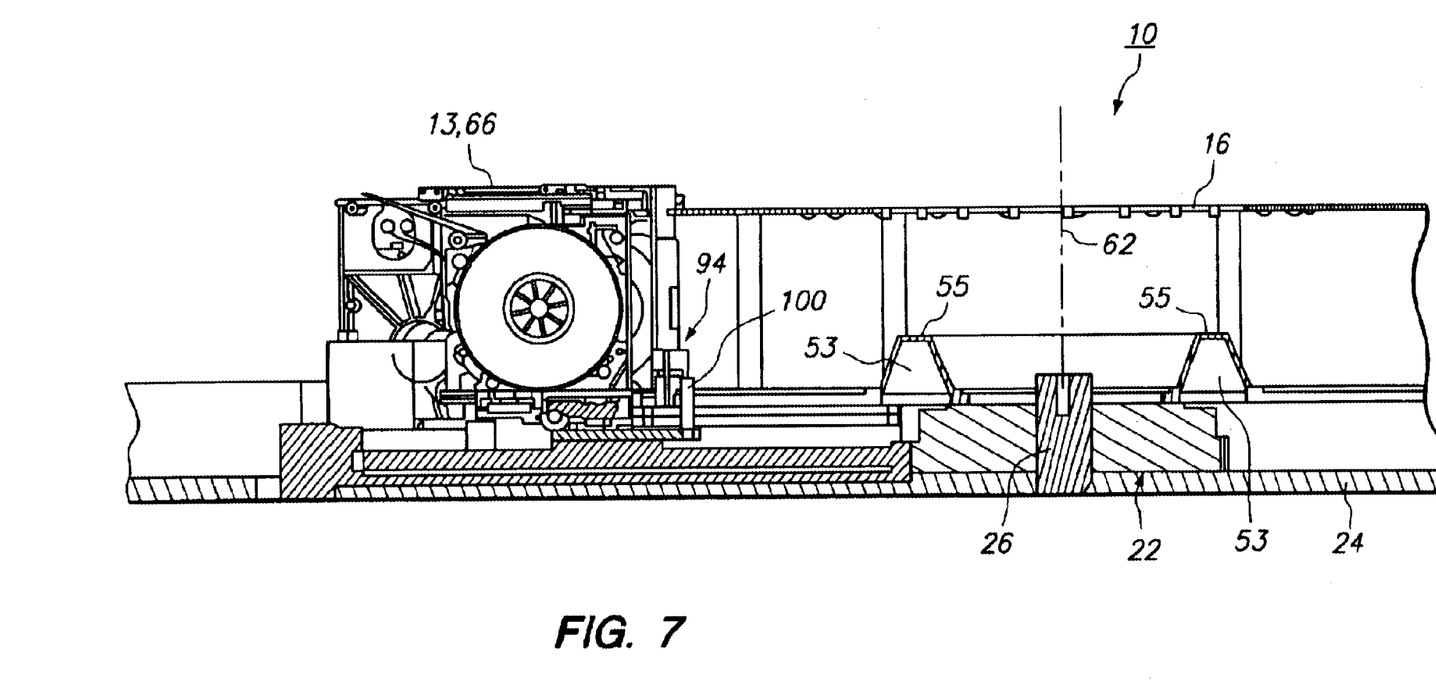
FIG. 7 is a cross-sectional view of a portion of the storage system including the rack assembly, a housing base and the first tape drive having features of the present invention.

The magazine bottom 44 can also include a clearance channel 53, as illustrated in cross-section on FIG. 7. The clearance channel 53 allows rotation of the cartridge magazine 16 without impedance by the transport assemblies 28, 32, as provided in greater detail below. Stated another way, components of the transport assemblies 28, 32, which extend into the tape cavities 18 would otherwise prevent movement of the cartridge magazine 16. The design of the clearance channel 53 can vary depending upon the requirements of the cartridge magazine 16 and the storage system 10.

The specific design of the clearance channel wall 55 can vary. In the embodiment illustrated in FIGS. 6 and 7, an inverted U-shaped clearance channel wall 55 defines the clearance channel 53. The transport assemblies 28, 32, retract toward the magazine mount 22 so that the components that extend into the tape cavities 18 retreat through channel slots (not shown) in the clearance channel wall 55 into the clearance channel 53. With this design, the cartridge magazine 16 rotates during operation of the tape storage system 10, without interference by the transport assemblies 28, 32.

The magazine bottom 44 can be removable, or alternatively, the magazine bottom 44 can be permanently fixed to the magazine body 40. The magazine bottom 44 also can include one or more bottom fasteners 54 such as bolts or screws for securing the magazine bottom 44, and thus the cartridge magazine 16, to the magazine mount 22.

Referring to FIG. 3, the design of the magazine mount 22 can vary depending on the shape and size of the cartridge magazines 16 in the rack assembly 14. The magazine mount 22 can removably mount the cartridge magazine 16 to the housing base 24, as described below. The magazine mount 22 includes a mount body 56, and a mount rotator 58.

The mount body 56 is typically secured to the housing base 24 of the system housing 11 using fasteners such as bolts or screws (not shown). The mount body 56 can be formed from durable materials such as metal or plastic, although other suitably durable materials can be used.

The mount rotator 58 removably secures the cartridge magazine 16 to the magazine mount 22. The mount rotator 58 can vary in size and shape depending on the design of the cartridge magazine 16. The mount rotator 58 also moves and rotates at least 360 degrees relative to the mount body 56. The cartridge magazine 16 can be centered and secured onto the mount rotator 58 of the magazine mount 22. As the mount rotator 58 rotates relative to the mount body 56, the cartridge magazine 16 similarly rotates. The mount rotator 58 typically includes one or more bottom fastener apertures 60 for receiving the bottom fasteners 54 of the magazine bottom 44, which are used to secure the cartridge magazine 16 to the magazine mount 22.

The magazine mover 26 rotates the mount rotator 58 of the magazine mount 22. In so doing, the cartridge magazine 16 rotates about an axis of rotation 62 as shown in phantom on FIGS. 3 and 7. The magazine mover 26 is typically a rotary actuator, although other suitable movers can be used.

As explained above, the rack assembly 14 includes the transport assembly group 27, which further includes the first transport assembly 28. The transport assembly group 27 can also include additional transport assemblies, as provided below. The first transport assembly 28 transports one of the cartridges 20 between the cartridge magazine 16 and a first tape drive 66. The design of the first transport assembly 28 can vary depending on the requirements of the rack assembly 14 and the cartridge magazine 16. In the embodiment illustrated in the figures, the first transport assembly 28 is positioned generally between the magazine mount 22 and the first tape drive 66 and the first transport assembly 28 moves the cartridge 20 substantially linearly between the cartridge magazine 16 and the first tape drive 66.

Figure 5:
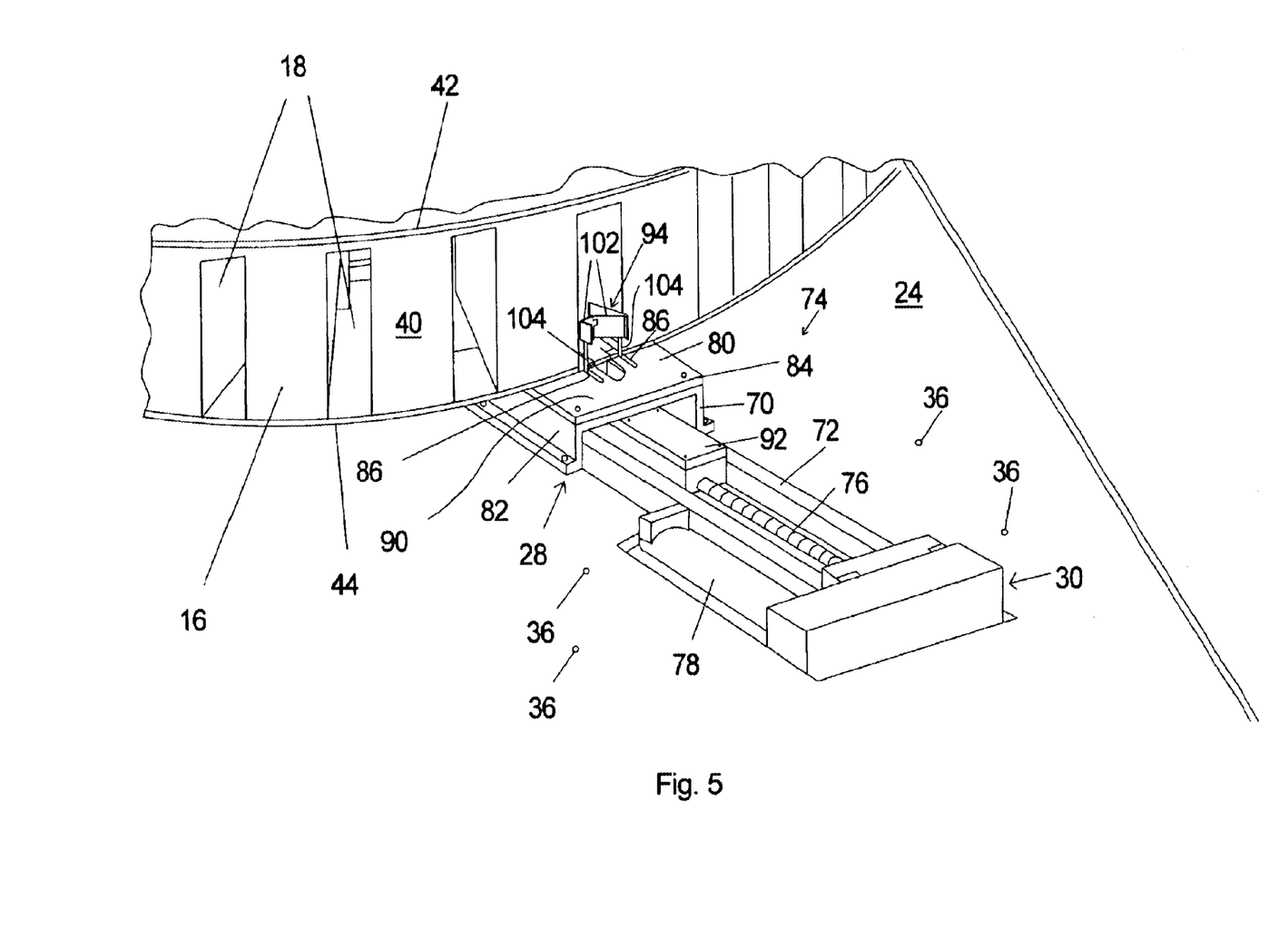
FIG. 5 is a perspective view of a portion of the rack assembly, including portions of a first transport assembly having features of the present invention.

Referring to FIGS. 3 and 5, the first transport assembly 28 includes (i) a mount end 68, (ii) a drive end 70, (iii) a gripper assembly guide 72, (iv) a gripper assembly 74, (v) a lead screw 76, and (vi) an actuator 78. The mount end 68 of the first transport assembly 28 is mounted to the housing base 24 adjacent to the magazine mount 22, substantially between the cartridge magazine 16 and the housing base 24. The drive end 70 is positioned near the first tape drive 66.

The gripper assembly guide 72 guides movement of the gripper assembly 74 between the mount end 68 and the drive end 70 of the first transport assembly 28. In the embodiment illustrated in the Figures, the gripper assembly guide 72 includes a guide top plate 80 and two guide side plates 82. The guide top plate 80 includes a gripper riser track 84 and two clip guide tracks 86 for guiding movement of the gripper assembly 74, as explained below. The guide top plate 80 also includes a plate proximal end 88 positioned near the magazine mount 22, and a plate distal end 90 positioned near the tape drive 13. In this embodiment, the guide side plates 82 secure the 80 guide top plate to the housing base 24.

The gripper assembly 74 temporarily grips one of the cartridges 20 and transports the cartridge 20 between the cartridge magazine 16 and the first tape drive 66. The design of the gripper assembly 74 can vary depending upon the requirements of the tape storage system 10 and the cartridge magazine 16. In the embodiment illustrated in the Figures, the first assembly 74 is mounted to and moves substantially linearly along the lead screw 76, between the mount end 68 and the drive end 70 of the first transport assembly 28. In this embodiment, the gripper assembly 74 includes a carriage 92 having an internally threaded aperture (not shown) and a cartridge gripper 94. The internally threaded aperture of the carriage 92 engages the lead screw 76, which is a corresponding externally threaded member. With this design, rotation of the lead screw 76 by the linear actuator 78 results in movement of the carriage 92 between the mount end 68 and the drive end 70 of the first transport assembly 28. The carriage 92 sits within the gripper assembly guide 72. The upright positioning of the carriage 92 is maintained during turning of the lead screw 76 due to at least partial confinement of the carriage 92 within the gripper assembly guide 72, as shown in FIG. 5.

The cartridge gripper 94 grips one of the cartridges 20 in order to transport the cartridge 20 between the cartridge magazine 16 and the first disk drive 66. The design of the cartridge gripper 94 can vary depending upon the design requirements of the tape storage system 10. In the embodiment illustrated in the Figures, the cartridge gripper 94 is secured to the carriage 92 and includes a gripper riser 100, two gripper clips 102, and two clip guides 104 (only one is shown in FIG. 3). The gripper riser 100 is secured to the carriage 92. In some embodiments, the gripper riser 100 is positioned substantially perpendicular to the guide top plate 80 of the gripper assembly guide 72, and moves along the gripper riser track 84. With this design, the gripper riser 100 extends from the carriage 92 up through one of the bottom apertures 52 of the magazine bottom 44. Further, the gripper riser 100 maintains the gripper clips 102 above the gripper assembly guide 72 so that the gripper clips 102 can securely clasp one of the cartridges 20 during operation of the rack assembly 14.

The gripper clips 102 are pivotably mounted to the gripper riser 100. The gripper clips 102 move relative to each other in order to clasp one of the cartridges 20 therebetween during operation of the rack assembly 14. Each of the gripper clips 102 is attached to one of the clip guides 104.

The clip guides 104 move along the clip guide tracks 86 as the carriage 92 moves between the mount end 68 and the drive end 70 of the first transport assembly 28. As previously indicated, the clip guide tracks 86 guide movement of the clip guides 104. The clip guide tracks 86 extend substantially from the plate proximal end 88 to the plate distal end 90 of the guide top plate 80. The clip guide tracks 86 deviate slightly near the plate proximal end 88 and the plate distal end 90, as shown in FIG. 3. With this design, the clip guides 104 momentarily move away from the gripper riser track 84, causing the gripper clips 102 to move to an "open" position in order to fit around one of the cartridges 20. Once the gripper clips 102 are positioned around the cartridge 20, the shape of the clip guide tracks 86 deviates again so that the clip guides 104 move back toward the gripper riser track 84, thereby causing the gripper clips 102 to move to a "closed" position to clasp the cartridge 20. In this manner, the gripper clips 102 can securely grasp the cartridge 20 during transport, and release the cartridge 20 once the cartridge 20 has reached the appropriate destination.

As provided above, the first transport assembly 28 also includes the actuator 78 which can, for example, be a motor assembly for moving the carriage 92 along the lead screw 76. The motor assembly can include a motor (not shown), a drive pulley (not shown), and a drive belt (not shown) for rotating the lead screw 76, thereby moving the carriage 92 between the mount end 68 and the drive end 70 of the first transport assembly 28. Other suitable linear actuators 78 can be used for this purpose.

Referring back to FIG. 2, the transport assembly group 27 can also include a second transport assembly 32 for transporting cartridges 20 between the cartridge magazine 16 and a second tape drive 106. The second transport assembly 32 transports one of the cartridges 20 between the cartridge magazine 16 and the second tape drive 106. The design of the second transport assembly 32 can vary depending on the requirements of the rack assembly 14, the cartridge magazine 16 and the tape storage system 10. Further, the design of the second transport assembly 32 can vary from the design of the first transport assembly 28 depending upon the requirements of the tape storage system 10, and the design of the second tape drive 106. Alternatively, the second transport assembly 32 can be substantially identical to the first transport assembly 28. In the embodiment illustrated herein, the second transport assembly 32 operates substantially similarly to the first transport assembly 28. In this design, the second transport assembly moves the cartridge 20 substantially linearly between the cartridge magazine 16 and the second tape drive 106.

In the event the design of the second tape drive 106 differs significantly from the first tape drive 66, the second transport assembly 32 can be modified to accommodate such differences. For example, if the second tape drive 106 utilizes the second-sized cartridge 20B, as opposed to the first-sized cartridge 20A used by the first tape drive 66, the second transport assembly 32 can be modified accordingly. However, the general structural and mechanical aspects of the second transport assembly 32 can be comparable to those of the first transport assembly 28.

The second transport assembly 32 typically extends radially away from the magazine mount 22, toward the second tape drive 106. The positioning of the second transport assembly 32 can vary depending upon the location of the first transport assembly 28 and the positioning of the second tape drive 106. Typically, the second transport assembly 32 is mounted adjacent to the first transport assembly 28, near the magazine mount 22. Alternatively, the second transport assembly 32 can be mounted at any location around the circumference of the magazine mount 22.

Additional transport assemblies (not shown) can be included in the transport assembly group 27, and would function similarly to the first transport assembly 28 and the second transport assembly 32. Each additional transport assembly can accommodate either similar sized cartridges 20 to the first or second transport assemblies 28, 32, or different sized cartridges 20.

By incorporating the first transport assembly 28 and the second transport assembly 32 into the present invention, greater efficiency and productivity is achieved. For instance, in the event the first tape drive 66 becomes inoperable or in need of servicing or repair, the first tape drive 66 can be removed without the need for the taking the tape storage system 10 completely offline. The second tape drive 106, can continue to operate in conjunction with the second transport assembly 32 and the cartridge magazine 16, even while the first tape drive 66 is offline.

Moreover, the rack assembly 14 has the ability to accommodate at least two different types of tape drives 66, 106, simultaneously. Thus, the tape storage system 10 can include two different tape drives 66, 106, utilizing two different sized cartridges 20A, 20B.

With this design, the rack assembly 14 allows the transport assemblies 28, 32, to remain stationary, while the cartridge magazine 16 quickly and efficiently rotates to align the appropriate cartridge 20 with one of the transport assemblies 28, 32. The transport assembly is then able to linearly load the cartridge directly into the corresponding tape drive 66, 106. Further, while the first tape drive 66 is in use, the second transport assembly 32 can retrieve one of the remaining cartridges 20 and load the cartridge 20 into the second tape drive 106 for immediate startup following conclusion of utilizing the first tape drive 66. As a consequence, the tape storage system suffers only minimal downtime, thereby increasing efficiency and throughput of the storage system 10.

While the particular tape storage system 10 and rack assembly 14 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A rack assembly for use with a plurality of cartridges one or more tape drives including a first tape drive, the rack assembly comprising:
   a housing base;
   a cartridge magazine that is rotatably coupled to the housing base, the cartridge magazine selectively retaining one or more of the cartridges;
   a first transport assembly that pushes one of the cartridges from the cartridge magazine into the first tape drive, the first transport assembly including a cartridge gripper and a carriage that movably supports the cartridge gripper, the carriage only moving in a substantially linear direction relative to the first tape drive; and
   a second transport assembly including a mover means for pushing one of the cartridges from the cartridge magazine into a second tape drive.

2. The rack assembly of claim 1 wherein the first transport assembly is positioned to move one of the cartridges between the cartridge magazine and the first tape drive without the first transport assembly rotating relative to the housing base.

3. The rack assembly of claim 1 wherein the first transport assembly is fixedly aligned with the first tape drive and the second transport assembly is fixedly aligned with the second tape drive.

4. The rack assembly of claim 1 wherein the cartridge pushed by the first transport assembly and the cartridge pushed by the second transport assembly are different sizes.

5. The rack assembly of claim 1 further comprising a magazine mover that rotates the cartridge magazine about an axis of rotation that is substantially orthogonal to the housing base.

6. The rack assembly of claim 1 wherein at least a portion of the first transport assembly is positioned substantially directly between the housing base and the cartridge magazine.

7. A rack assembly for use with a plurality of cartridges and one or more tape drives, the rack assembly comprising:
   a housing base that supports a first tape drive and a second tape drive;
   a cartridge magazine that is rotatably coupled to the housing base, the cartridge magazine including a tape cavity for housing one or more of the cartridges, the cartridge magazine rotating about an axis of rotation;
   a first transport assembly that is secured to the housing base, the first transport assembly including a first mover means for pushing one of the cartridges from the cartridge magazine into the first tape drive without the first transport assembly rotating relative to the housing base; and
   a second transport assembly, the second transport assembly including a second mover means for pushing one of the cartridges from the cartridge magazine into the second tape drive.

8. The rack assembly of claim 7 wherein the first transport assembly includes a cartridge gripper and a carriage that movably supports the cartridge gripper, the carriage only moving in a substantially linear direction relative to the first tape drive.

9. The rack assembly of claim 7 wherein the at least one of the transport assemblies is positioned substantially between the cartridge magazine and the housing base.

10. The rack assembly of claim 7 wherein the cartridge moved by the first transport assembly and the cartridge moved by the second transport assembly are different sizes.

11. The rack assembly of claim 7 wherein the first transport assembly is fixedly aligned with the first tape drive, and the second transport assembly is fixedly aligned with the second tape drive.

12. The rack assembly of claim 7 further comprising a magazine mover that rotates the cartridge magazine about the axis of rotation, the axis of rotation being substantially orthogonal to the housing base.

13. A rack assembly for use with a plurality of cartridges one or more tape drives, the rack assembly comprising:
   a housing base that supports a first tape drive;
   a cartridge magazine that is rotatably coupled to the housing base, the cartridge magazine rotating about an axis of rotation, the cartridge magazine including a tape cavity for selectively retaining one of the cartridges;
   a first gripper assembly that engages one of the cartridges; and
   a first mover that moves the first gripper assembly in a substantially linear direction between the axis of rotation and the first tape drive, the first mover being positioned substantially between the cartridge magazine and the housing base.

14. The rack assembly of claim 13 wherein the mover moves toward and away from the first tape drive.

15. The rack assembly of claim 13 wherein the mover moves the gripper assembly to push one of the cartridges from the cartridge magazine into the first tape drive.

16. The rack assembly of claim 15 further comprising a second mover and a second gripper assembly, the second mover moving the second gripper assembly to push one of the cartridges from the cartridge magazine into a second tape drive.

17. The rack assembly of claim 16 wherein the cartridge moved by the first gripper assembly and the cartridge moved by the second gripper assembly are different sizes.

18. The rack assembly of claim 13 further comprising a magazine mover that rotates the cartridge magazine about the axis of rotation, the axis of rotation being substantially orthogonal to the housing base.

19. The rack assembly of claim 13 wherein the first mover is positioned substantially directly between the housing base and the cartridge magazine.

20. A rack assembly for use with a first tape drive, a second tape drive, a first cartridge and a second cartridge, the rack assembly comprising:
 a housing base;
 a cartridge magazine that is rotatably coupled to the housing base, the cartridge magazine including a plurality of tape cavities for selectively retaining at least one of the cartridges;
 a first transport assembly including a first mover means for pushing the first cartridge from the cartridge magazine toward the first tape drive; and
 a second transport assembly including a second mover means for pushing the second cartridge from the cartridge magazine toward the second tape drive.

21. The rack assembly of claim 20 wherein the first cartridge and the second cartridge are different sizes.

22. The rack assembly of claim 20 wherein the first transport assembly includes a first cartridge gripper and a first carriage that movably supports the first cartridge gripper, the first carriage only moving in a substantially linear direction relative to the first tape drive.

23. The rack assembly of claim 22 wherein the second transport assembly includes a second cartridge gripper and a second carriage that movably supports the second cartridge gripper, the second carriage only moving in a substantially linear direction relative to the second tape drive.

24. The rack assembly of claim 23 wherein at least one of the carriages is positioned substantially between the cartridge magazine and the housing base.

25. The rack assembly of claim 20 wherein the cartridge moved by the first transport assembly and the cartridge moved by the second transport assembly are different sizes.

26. The rack assembly of claim 20 wherein the first transport assembly is fixedly aligned with the first tape drive, and the second transport assembly is fixedly aligned with the second tape drive.

27. The rack assembly of claim 20 further comprising a magazine mover that rotates the cartridge magazine about an axis of rotation, the axis of rotation being substantially orthogonal to the housing base.

28. A rack assembly for use with a plurality of cartridges and one or more tape drives, the rack assembly comprising:
 a housing base that supports a first tape drive;
 a cartridge magazine that is rotatably coupled to the housing base, the cartridge magazine including a tape cavity for housing one or more of the cartridges, the cartridge magazine rotating about an axis of rotation;
 a first transport assembly that is secured to the housing base, the first transport assembly including a gripper assembly that engages one of the cartridges, the first transport assembly being positioned to move one of the cartridges between the cartridge magazine and the first tape drive without the first transport assembly rotating relative to the housing base; and
 a mover that moves the gripper assembly substantially linearly between the axis of rotation and the first tape drive, the mover being positioned substantially between the cartridge magazine and the housing base.

29. The rack assembly of claim 28 wherein the first transport assembly includes a first cartridge gripper and a first carriage that movably supports the first cartridge gripper, the first carriage only moving in a substantially linear direction relative to the first tape drive.

30. The rack assembly of claim 29 wherein the first carriage moves toward and away from the first tape drive.

31. The rack assembly of claim 28 wherein the cartridge magazine rotates about an axis of rotation that is substantially orthogonal to the housing base.

32. The rack assembly of claim 31 wherein the first transport assembly includes a first mover and a first cartridge gripper, the first mover moving the first cartridge gripper substantially linearly between the axis of rotation and the first tape drive.

33. A rack assembly for use with a plurality of cartridges one or more tape drives including a first tape drive, the rack assembly comprising:
 a housing base that supports the first tape drive;
 a cartridge magazine that is rotatably coupled to the housing base, the cartridge magazine rotating about an axis of rotation, the cartridge magazine selectively retaining one or more of the cartridges; and
 a first transport assembly that moves one of the cartridges between the cartridge magazine and the first tape drive, the first transport assembly including (i) a gripper assembly that engages one of the cartridges, the gripper assembly including a cartridge gripper and a carriage that movably supports the cartridge gripper, and (ii) a mover that moves the gripper assembly substantially linearly substantially between the axis of rotation and the first tape drive, the mover being positioned substantially between the cartridge magazine and the housing base.

34. A rack assembly for use with one or more tape drives and a plurality of cartridges, the rack assembly comprising:
 a housing base that supports a second tape drive;
 a cartridge magazine that is rotatably coupled to the housing base, the cartridge magazine including a plurality of tape cavities for housing at least one of the cartridges;
 a first transport assembly that is fixedly aligned with a first tape drive, the first transport assembly including a first mover means for transporting one of the cartridges between the cartridge magazine and the first tape drive; and
 a second transport assembly including a second mover means for pushing one of the cartridges from the cartridge magazine into the second tape drive.

35. The rack assembly of claim 34 wherein the cartridge moved by the first transport assembly and the cartridge moved by the second transport assembly are different sizes.

36. The rack assembly of claim 34, wherein the second transport assembly is fixedly aligned with the second tape drive.

37. A rack assembly for use with one or more tape drives and a plurality of cartridges, the rack assembly comprising:

a housing base;

a cartridge magazine that is rotatably coupled to the housing base, the cartridge magazine rotating about an axis of rotation that is substantially orthogonal to the housing base, the cartridge magazine including a plurality of tape cavities for housing at least one of the cartridges; and a first transport assembly that is fixedly aligned with a first tape drive, the first transport assembly transporting one of the cartridges from the cartridge magazine toward the first tape drive, the first transport assembly including a first mover and a first cartridge gripper, the first mover moving the first cartridge gripper substantially linearly between the axis of rotation and the first tape drive, the first mover being positioned substantially between the cartridge magazine and the housing base.

\* \* \* \* \*

UNITED STATES PATENT AND TRADEMARK OFFICE
CERTIFICATE OF CORRECTION

PATENT NO. : 6,710,969 B2
DATED : March 23, 2004
INVENTOR(S) : Gariepy et al.

It is certified that error appears in the above-identified patent and that said Letters Patent is hereby corrected as shown below:

Title page,
Item [56], References Cited, U.S. PATENT DOCUMENTS, insert the following:

| | | |
|---|---|---|
| 5,610,882 | March 1997 | Dang |
| 5,532,931 | July 1996 | Erickson, Jr. et al. |
| 5,460,476 | October 1995 | Gazza |
| 5,429,470 | July 1995 | Nicol et al. |
| 5,362,192 | Nov. 1994 | Dang |
| 5,337,297 | August 1994 | Kvifte et al. |
| 5,323,327 | June 1994 | Carmichael et al. |
| 5,274,516 | Dec. 1993 | Kakuta et al. |
| 5,157,564 | October 1992 | Theobald et al. |
| 5,128,912 | July 1992 | Hug et al. |
| 5,050,020 | Sept. 1991 | Campbell et al. |

Column 6,
Line 5, pelase delete "The specific design of the clearance channel wall 55 can vary."
Line 8, please insert -- The specific design of the clearance channel wall 55 can vary. --

Column 7,
Line 25, please delete "first" and insert -- gripper --.

Signed and Sealed this

Twentieth Day of July, 2004

JON W. DUDAS
*Acting Director of the United States Patent and Trademark Office*